United States Patent [19]

Naito

[11] 4,383,442
[45] May 17, 1983

[54] APPARATUS FOR SENSING THE PRESENCE AND POSITION OF A CRANK PULLEY BOLT IN AN INTERNAL COMBUSTION ENGINE

[75] Inventor: Tadashi Naito, Toyota, Japan

[73] Assignee: Toyota Jidosha Kogyo Kabushiki Kaisha, Toyota, Japan

[21] Appl. No.: 226,543

[22] Filed: Jan. 21, 1981

[30] Foreign Application Priority Data

Jan. 22, 1980 [JP] Japan ................................ 55-6151[U]

[51] Int. Cl.³ .......................................... G01M 15/00
[52] U.S. Cl. .................................... 73/119 R; 73/116; 73/118; 324/208
[58] Field of Search ..................... 73/116, 118, 119 R; 324/207, 208

[56] References Cited

U.S. PATENT DOCUMENTS

| 3,930,201 | 12/1975 | Ackermann | 324/208 |
| 4,066,949 | 1/1978 | Condrac | 324/207 |
| 4,164,864 | 8/1979 | Feller | 324/207 |
| 4,258,324 | 3/1981 | Henrich | 324/208 |

Primary Examiner—Howard A. Birmiel
Attorney, Agent, or Firm—Kenyon & Kenyon

[57] ABSTRACT

The presence and location of a crank pulley bolt on one end of an internal combustion engine is detected by moving a sensing surface on a jig toward the bolt location until it stops, either by contact with the bolt or the pulley, if the bolt is missing. Then a sensor rigidly connected to the sensing jig detects the position of the jig relative to the V-shaped rim of the pulley.

10 Claims, 3 Drawing Figures

APPARATUS FOR SENSING THE PRESENCE AND POSITION OF A CRANK PULLEY BOLT IN AN INTERNAL COMBUSTION ENGINE

BACKGROUND OF THE INVENTION

1. Field of the Invention

This invention relates to the field of sensing the position of a crank pulley bolt relative to the location of a particular part of the crank pulley of an internal combustion engine. In particular, it relates to the sensing of position of a crank pulley bolt by determination of electromagnetic energy absorption in the V-shaped rim of a crank pulley.

2. Prior Art

It has been the practice heretofore in the assembly of internal combustion engines to utilize a mechanical sensing device, such as a dog-jig, attached to a cylinder capable of being moved into a predetermined position relative to an internal combustion engine to determine whether the fastening bolt for the crank pulley of the engine has been inserted or not. If the bolt has been inserted, the dog-jig has been used to sense whether the bolt has been properly tightened to hold the pulley firmly in place.

However, relying only on a mechanical sensing device, it is difficult to detect precisely whether or not the crank pulley bolt is present and, particularly, to determine whether it has been properly tightened. This is due to the fact that it is difficult to position such a large work piece as an internal combustion engine so that a jig can be brought into proper alignment with one small part of the engine, the crank pulley bolt.

OBJECTS AND SUMMARY OF THE INVENTION

It is one of the objects of the present invention to provide means to sense whether or not a crank pulley bolt has been inserted to hold the crank pulley of an internal combustion engine in position.

Another object of the invention is to provide means for sensing whether or not the crank pulley bolt has been tightened to the correct position relative to the pulley.

Still another object of the invention is to provide crank pulley bolt position sensing means utilizing the measurement of high frequency electromagnetic energy losses in a discriminating circuit to determine the position of the crank pulley relative to the detected position of the crank pulley bolt.

A further object of the invention is to provide means for sensing the position of a crank pulley bolt by reference to the crank pulley, itself, instead of having to depend on accurate position of the entire engine so as to bring the bolt into exact position with respect to the measuring apparatus.

A further object of the invention is to provide crank pulley bolt sensing means incorporating a contact portion to be brought into abutting position against a flange-shaped collar portion of a crank pulley bolt to allow detection of any variation of the positional relation between the crank pulley and a sensor jig when the crank pulley is rotated, thereby to determine accurately and easily whether or not the crank pulley bolt has been correctly fastened in place.

A still further object of the invention is to provide a sensor having a cylindrical portion to be brought into abutment against the collar of a crank pulley bolt to enable the sensing and correct fastening of the bolt to be determined without rotation of the crank pulley.

Still a further object of the present invention is to provide sensing means adjacent to the rim of a crank pulley to determine, by distinguishing between the nearness to the valley of the V-shaped portion of the pulley or to the crest on one side of the valley, whether or not a crank pulley bolt has been properly positioned to hold the pulley in place on an internal combustion engine.

Yet a further object is to provide means for rotating the crank shaft of the engine to rotate the pulley in order to detect erroneous fastening of the pulley to the crank shaft accuately, easily, and automatically.

In accordance with the present invention, an internal combustion engine mounted on a pallet is brought into proper position relative to sensing apparatus. The location of the engine relative to the sensing apparatus, particularly in the longitudinal direction of the engine, need not be precisely set, provided it is sufficiently accurate to allow a sensing surface of the sensing apparatus to be moved to a stopping position where it should engage the crank pulley bolt or, more precisely, the collar of the bolt. The apparatus includes sensor means mounted at a predetermined spaced relationship with respect to the abutting surface of the sensor apparatus so that, if the bolt is properly in position, the sensor means should be in a certain position relative to the rim of the pulley. The cross-section of the rim is V-shaped, and the sensor means includes means to direct electromagnetic energy at the rim of the pulley. The pulley absorbs some of the energy, and the amount of the energy thus lost is measured. Because the rim of the pulley is V-shaped, a small displacement of the sensor means axially relative to the pulley will place the sensor either adjacent to the crest of the pulley or to the valley between the two crests or at some point along the slope between the crest and the valley. The closer the sensor means is to the crest, the greater the loss of energy, and the slope between the slope and the valley causes the change in loss to be relatively large over a small axial distance, thus leading to an easy determination of the exact position of the abutting surface of the sensor jig means relative to the pulley. Not only will there be an easily detectable difference in loss if the bolt against which the abutting surface is supposed to strike is present or not present, but any significant displacement of the bolt from its proper position, as for example by failure to tighten the bolt properly, will also produce a detectable difference in the loss of electromagnetic energy.

By providing a small V-shaped notch on the rim of the pulley, and by rotating the crank shaft of the engine, it can easily be determined whether or not the pulley rotates with the crank shaft, as it should if the bolt is properly tightened.

DETAILED DESCRIPTION OF THE PREFERRED EMBODIMENT OF THE INVENTION

Figure 1:
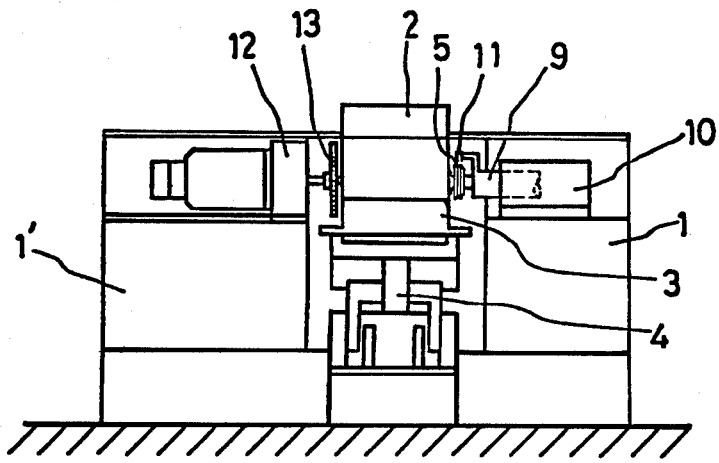
FIG. 1 is a front elevational view showing sensor apparatus in an internal combustion engine and whether the bolt has been properly fastened, in accordance with the present invention.
Figure 2:
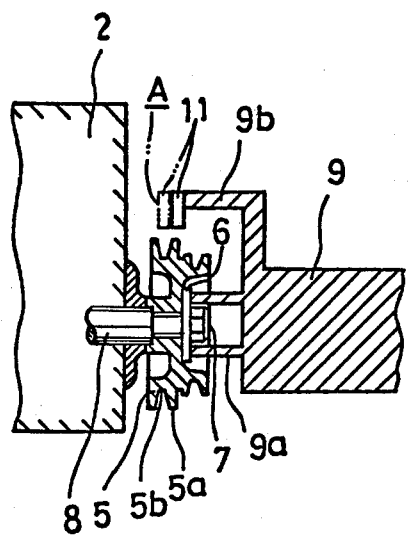
FIG. 2 is an enlarged view of a fragment of the apparatus in FIG. 1 to illustrate the positional relationship between sensing components.

FIG. 1 shows horizontal supporting bases 1 and 1' between which is an internal combustion engine 2 supported on a pallet 3. The pallet, in turn, is supported on a lifter 4 to be moved vertically relative to the bases 1 and 1'. The engine 2 includes a crank pulley 5 at one end thereof. The pulley is shown in greater detail in FIG. 2 in which a collar 6 may be seen, along with a central crank pulley bolt 7 that bolts the pulley 5 to the end of a crank shaft 8 in the engine 2.

The sensor apparatus to be used to determine whether the bolt 7 has been properly positioned and tightened in the pulley 5 includes a sensor jig 9 mounted on an actuator 10 (FIG. 1) for longitudinal movement on the base 1 relative to the engine 2. As may be seen in FIG. 2, the end of the sensor jig 9 includes a contact part 9a that has an abutting, or sensing, surface 9c at its outermost end to engage a collar 6 on the crank pulley bolt 7. In addition, the sensor jig 9 has a projection 9b that extends upwardly and outwardly toward the engine 2. A sensor 11 is attached to the projection 9b, and the relative position between the sensor 11 and the abutting surface at the end of the contact part 9a is such that, if the sensing surface 9c is in contact with a properly positioned collar 6, the sensor will be over one of the crests 5a of the pulley 5.

The sensor 11 is a coil energized by an oscillating current that, typically, has a frequency of a few kilohertz. It is well known that conductive materials absorb high frequency electromagnetic energy. The amount of absorption depends on the frequency, the nature of the absorbing material, the configuration of the absorbing material, and the spacing between an energy radiating device and the absorbing structure. In the present invention, the metal pulley material and the configuration of the pulley are kept constant for all engines of the given design. If these parameters are changed, the change can easily be taken into account. In addition, the frequency of the electromagnetic energy applied to the sensor 11 is also maintained constant. The sensor coil is excited by the electromagnetic energy to provide a field of limited extent that includes the immediately adjacent part of the pulley 5. By keeping all of the parameters constant except the axial position of the sensor 11 relative to the pulley 5, any change in this relative axial position can be measured by the standard means for measuring the loss of electromagnetic energy in such a device. For example, the coil may be part of the tuned circuit of an oscillator that produces oscillations of a certain amplitude when there are no loss-producing materials near the coil but produces oscillations of lower and lower amplitude as the coil moves closer and closer to loss-producing materials, such as metals that have eddy currents induced in them.

The shape of the pulley 5 is particularly advantageous in making measurements according to the present invention. At each edge of the rim of the pulley is a crest, such as the crest 5a, and between the two crests is a valley 5b that is substantially farther away from the sensor 11 than is the crest 5a. If the sensor 11 is directly over the crest 5a, as is indicated in solid lines in FIG. 2, the loss of electromagnetic energy from the sensor will be greatest. On the other hand, if the sensor 11 can be moved to the position A shown in dot-dash lines, directly over the valley 5b, the loss of energy will be less because the metal that forms the valley 5b is substantially farther away from the sensor. Moreover, the relatively steeply sloping surface of the pulley between the crest 5a and the valley 5b causes the energy loss to change in a predetermined manner corresponding to each position between the position shown in solid lines and position A. This provides an easily detectable and accurate means of determining the exact position of the sensor 11 with respect to the pulley 5.

The relative position between the sensor 11 and the pulley 5 is determined by how far to the left the sensor jig 9 is able to move before the abutting surface at the end of the contact part 9a is stopped. If the crank pulley bolt 7 with its collar 6 is properly tightened in the crank shaft 8, the sensor jig 9 will be stopped with the sensor 11 in the position shown in solid lines, but if the bolt and collar are missing, the sensor jig 9 will continue to be moved to the left until the sensing surface 9c strikes the base of the pulley 5 and is stopped thereby. This means that the sensor jig 9 will be to the left of the position shown and the sensor 11 will be in the position A.

The apparatus shown in FIG. 1 also has a motor 12 mounted on the support base 1' to serve as a rotating device for the crank shaft 8. The motor is connected to the crank shaft by way of a flywheel 13 and thus is connected through the crank shaft to the pulley 5.

Figure 3:
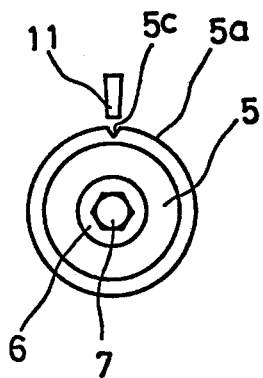
FIG. 3 shows a crank pulley, such as may be used in the engine in FIG. 1, and including means for sensing the rotational position thereof in accordance with the present invention.

FIG. 3 shows a V-shaped groove 5c in the crest 5a of the crank pulley 5 to be used for timing valves in the internal combustion engine 2. By means of the V-groove 5c, and the sensor 11, it is also possible to detect both the existence of the crank pulley bolt 7 and the proper fastening thereof.

Operation of the preferred embodiment of the invention will now be described.

The engine 2 is placed in a predetermined position on the pallet 3, which is then elevated by the lifter 4 to bring the axis of the crank pulley 5 into substantial alignment with the sensor jig 9. The sensor jig is then moved to the left by the actuator 10 so that the sensing surface 9c of the contact part 9a is brought into contact with the surface of the collar 6 of the crank pulley bolt 7, assuming that the collar and the bolt are present. The sensor 11 will then be in a properly spaced relationship with respect to the outer circumference of the crank pulley 5, and will either be over the crest 5a or the valley 5b or some point in between, as determined by the position of the collar 6 relative to the pulley 5.

The crank shaft 8 and the pulley 5 are then rotated by the motor 12. If the crank pulley bolt 7 is missing, along with the collar 6, the sensor 11 is in the position A, and there will be less loss of electromagnetic energy then if the sensor 11 is in the position shown in full lines in FIG. 2. If the crank pulley bolt 7 is improperly fastened, the position of the sensor 11 will be slightly displaced with respect to the crank pulley 5. Even if the displacement is as small as approximately 0.5 mm, the improper fastening may be sensed by determining the loss of energy relative to the loss of energy that would be encountered if the fastening were correct.

The sensor 11 may be supported by the projection 9b so that it is brought close to the face of the pulley 5 instead of being brought close to the rim. A loss of electromagnetic energy will still be produced although the measurement may be less sensitive with respect to the axial position of the sensor 11 than if the sensor is close to the V-shaped rim.

Furthermore, if the pulley 5 has the V-shaped 5c shown in FIG. 3, and if the crank pulley bolt is properly fastened, rotation of the crank shaft 8 by the motor 12 should cause a certain angular displacement of the V-groove 5c within a specified period of time. Such an indication shows that the crank pulley bolt 7 is not only present but has been properly tightened.

On the other hand, if the crank pulley bolt 7 is missing or is not properly tightened, an axially slight displacement of the bolt takes place when the crank pulley 5 is rotated. This displacement is easily sensed by the change in loss of electromagnetic energy from the sensor 11.

While a sensor jig of a specific configuration is illustrated, it is to be understood that other configurations may be used instead so long as the sensor is not in contact with the outer surface of the crank pulley.

The present invention makes it possible to detect accurately and easily a displacement of location of the crank pulley with respect to the sensor jig 9 and to detect improper tightening of the crank pulley bolt by rotating the crank pulley 5 once while the sensing surface 9c of the sensing jig 9 is abutted against the collar 6.

It is also possible to sense improper tightening of the crank pulley bolt 7 without rotating the crank pulley 5 by simply relying upon contact between the sensing surface 9c, which is in the form of an annular ring at the end of a cylinder, which allows it to be brought into abutment against the collar 6 of the bolt 7.

While this invention has been described in terms of a specific embodiment, it will be understood by those skilled in the art that it may be modified within the scope of the following claims.

What is claimed is:

1. Means for sensing the presence and position of a crank pulley bolt in a crank shaft of an internal combustion engine to be examined, said means comprising:
   (a) sensor jig means to be faced with the crank shaft in the vicinity of a place where the crank pulley bolt is to be assembled to the internal combustion engine, said sensor jig means having a reference portion adapted to engage a predetermined portion of said crank pulley bolt; and
   (b) sensor means kept spaced by a predetermined distance from said reference portion of the sensor jig means, and being able to be close to, but spaced from, said crank pulley so as to sense a positional relationship between said reference portion and a corresponding portion of the crank pulley, when the reference portion is set at a sensing place in the vicinity of said place where the crank pulley bolt is to be assembled to the internal combustion engine, on the basis of the comparison between a predetermined electromagnetic energy loss for a case that the crank pulley bolt is properly assembled to the internal combustion engine and an actual electromagnetic energy loss for the internal combustion engine being examined, whereby a difference between the actual loss and the predetermined loss indicates whether the crank pulley bolt is present or not, and whether the crank pulley bolt is properly assembled to the internal combustion engine being examined.

2. The invention as defined in claim 1, wherein said sensor means is mounted on said sensor jig means.

3. The invention as defined in claim 1, wherein said sensor means comprises:
   (a) a coil;
   (b) means to supply said coil with oscillating current, said coil being sufficiently close to said crank pulley in the sensing position to induce an electromagnetic energy loss from said coil into said crank pulley;
   (c) means to detect the actual electromagnetic energy loss from said coil into said crank pulley by comparison with the predetermined electromagnetic energy loss for the case that the crank pulley bolt is properly assembled to the internal combustion engine; and
   (d) means to indicate whether the crank pulley bolt is present or not, and whether the crank pulley bolt is properly assembled to the internal combustion engine to be examined or not.

4. The invention as defined in claim 1, wherein the crank pulley is provided with a V-shaped rim comprising two crests and a groove lying between said crests.

5. The invention as defined in claim 1, wherein the said crank pulley bolt has a flange-shaped collar which projects radially from the head of the crank pulley bolt, and which said reference portion is adapted to engage.

6. The invention as defined in claim 5, wherein said sensor jig means has a hollow cylinder at an end thereof and said reference portion is an end surface of said hollow cylinder in a form of annular ring.

7. The invention as defined in claim 1, further comprising:
   (a) a pallet to support said internal combustion engine to be examined; and
   (b) a lifter to elevate said pallet at a place where sensing is carried out.

8. The invention as defined in claim 1, further comprising an actuator which is adapted to move said sensor jig means toward or away from the internal combustion engine.

9. The invention as defined in claim 1, further comprising a motor for driving the crank pulley and wherein a notch is provided in the circumference of the crank pulley.

10. Apparatus for automatically determining proper assembly of a crank pulley bolt on a crankshaft of an internal combustion engine, the apparatus comprising:
   means for delivering an internal combustion engine to a predetermined location at an inspection station;
   a sensor jig having a reference surface;
   a proximity sensor mounted on the sensor jig in fixed spaced relation to the reference surface such that the sensor is positioned at a predetermined location closely spaced from a preselected surface region of a crank pulley mounted on the crankshaft of the engine, when said reference surface contacts a preselected portion of a properly tightened crank pulley bolt fastening the pulley to the crankshaft;
   means for moving the reference surface to the sensor jig along a path that intersects the predetermined location of said preselected portion of a crank pulley bolt, when the engine is at said predetermined location at said inspection station, until the reference surface contacts the engine; and
   means for comparing the signal from the proximity sensor with a predetermined signal corresponding to the reference surface being in contact with said preselected portion of a properly tightened crank pulley bolt.

* * * * *

UNITED STATES PATENT AND TRADEMARK OFFICE
CERTIFICATE OF CORRECTION

PATENT NO. : 4,383,442
DATED : 17 May 1983
INVENTOR(S) : Tadashi Naito

It is certified that error appears in the above—identified patent and that said Letters Patent is hereby corrected as shown below:

Column 6, line 58: change "to" to --of--.

Signed and Sealed this

Nineteenth Day of November 1985

[SEAL]

Attest:

DONALD J. QUIGG

Attesting Officer

Commissioner of Patents and Trademarks